(12) United States Patent
Golard et al.

(10) Patent No.: US 10,852,820 B1
(45) Date of Patent: Dec. 1, 2020

(54) GAZE-BASED VIRTUAL CONTENT CONTROL

(71) Applicant: Facebook Technologies, LLC, Menlo Park, CA (US)

(72) Inventors: Andre Golard, Seattle, WA (US); Bo Asp Andersen, Seattle, WA (US); Immo Andreas Schuetz, Redmond, WA (US); Karol Constantine Hatzilias, Kenmore, WA (US); Kelly Ingham, Redmond, WA (US); Martin Henrik Tall, Redwood City, CA (US); Neeraj Choubey, Belmont, CA (US); Sharvil Shailesh Talati, Mercer Island, WA (US); Robert Dale Cavin, Seattle, WA (US); Thomas Scott Murdison, Kirkland, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/283,153

(22) Filed: Feb. 22, 2019

(51) Int. Cl.
*G06F 3/01* (2006.01)

(52) U.S. Cl.
CPC .................... *G06F 3/013* (2013.01)

(58) Field of Classification Search
CPC ..................................... G06F 3/013
See application file for complete search history.

(56) References Cited

U.S. PATENT DOCUMENTS

| | | | | |
|---|---|---|---|---|
| 5,977,935 A | * | 11/1999 | Yasukawa | G02B 27/017 340/980 |
| 10,586,360 B2 | * | 3/2020 | DeLuca | G06F 3/013 |
| 2008/0062167 A1 | * | 3/2008 | Boggs | G06T 19/00 345/419 |
| 2016/0191910 A1 | * | 6/2016 | von und zu Liechtenstein | G06F 3/013 348/43 |
| 2016/0274762 A1 | * | 9/2016 | Lopez | G06T 19/006 |
| 2017/0160798 A1 | * | 6/2017 | Lanman | G06T 5/002 |
| 2017/0221264 A1 | * | 8/2017 | Perry | H04N 13/344 |
| 2017/0237974 A1 | * | 8/2017 | Samec | G06F 3/011 348/53 |

* cited by examiner

Primary Examiner — Ariel A Balaoing
(74) Attorney, Agent, or Firm — FisherBroyles, LLP

(57) ABSTRACT

Systems and methods for enabling gaze-based virtual content control may include (1) displaying an artificial scene with one or more virtual elements to a user wearing a head-mounted display system, (2) identifying the user's eye gaze based on gazing data collected by one or more sensors in the head-mounted display system, (3) determining that the user's eye gaze is focused on a specific virtual element, and (4) in response to determining that the user's eye gaze is focused on the specific virtual element, increasing the specific virtual element's visibility to the user. Various other methods, systems, and computer-readable media are also disclosed.

20 Claims, 6 Drawing Sheets

Virtual House 600 at Time 2

Virtual House 600 at *Time 1*

Virtual House 600 at *Time 2*

GAZE-BASED VIRTUAL CONTENT CONTROL

BACKGROUND

Virtual reality, augmented reality, and mixed reality systems (collectively known as artificial reality systems) may provide users with digital experiences that would not be possible in the real world. Some artificial reality systems include eye-tracking devices that determine user eye gaze (e.g., to determine where a user is visually focusing within a scene presented via the artificial reality system). The present disclosure identifies a need for systems and methods that use the gaze data available from such eye-tracking devices to allow users of artificial reality systems to manipulate virtual content with their eye gaze.

SUMMARY

As will be described in greater detail below, the present disclosure describes various systems and methods for gaze-based virtual content control. In one example, a computer-implemented method may include (1) displaying an artificial scene, which includes one or more virtual elements, to a user wearing a head-mounted display system, (2) identifying the user's eye gaze based on gazing data collected by one or more sensors in the head-mounted display system, (3) determining that the user's eye gaze is focused on a specific virtual element, and (4) in response to determining that the user's eye gaze is focused on the specific virtual element, increasing the specific virtual element's visibility to the user. The artificial scene may represent a virtual scene consisting exclusively of virtual elements and/or a mixed-reality scene comprising a combination of virtual elements and real-world elements.

At the time the user's eye gaze is determined to be focused on the specific virtual element, the specific virtual element may be an initial virtual distance from the user. Then, the specific virtual element's visibility may be increased by bringing the specific virtual element to an approached virtual distance that is virtually closer to the user than the initial virtual distance. Bringing the specific virtual element to the approached virtual distance may include enlarging the specific virtual element within the user's field of view.

In some examples, the specific virtual element may be at least partially covered from the user's field of view by one or more additional elements within the artificial scene. In these examples, increasing the specific virtual element's visibility may include bringing the specific virtual element more fully into view such that the specific virtual element is less covered by the additional elements. Bringing the specific virtual element more fully into view may include (1) moving the specific virtual element to be less covered by the additional elements and/or (2) bringing the specific virtual element to an approached virtual distance that is virtually closer to the user than the additional elements.

In one embodiment, bringing the specific virtual element more fully into view may include decreasing an opacity of the additional elements such that the user may see the specific virtual element through the additional elements. In one example, the specific virtual element may represent a specific virtual computer monitor displayed among a group of additional virtual computer monitors. In this example, the specific virtual element's visibility to the user may be increased by increasing the specific computer monitor's visibility. In some examples, the specific virtual element may include a group of virtual elements positioned at a particular gaze depth.

In one embodiment, a system for implementing the above-described method may include (1) a display module, stored in memory, that displays an artificial scene with one or more virtual elements to a user wearing a head-mounted display system, (2) a gaze-detection module, stored in memory, that (i) identifies the user's eye gaze based on gazing data collected by one or more sensors in the head-mounted display system and (ii) determines that the user's eye gaze is focused on a specific virtual element, and (3) a physical processor configured to execute the display module and the gaze-detection module. The gaze-detection module may, in response to the display module determining that the user's eye gaze is focused on the specific virtual element, increase the specific virtual element's visibility to the user.

In some examples, the above-described method may be encoded as computer-readable instructions on a non-transitory computer-readable medium. For example, a computer-readable medium may include one or more computer-readable instructions that, when executed by at least one processor of a computing device, may cause the computing device to (1) display an artificial scene, comprising one or more virtual elements, to a user wearing a head-mounted display system, (2) identify the user's eye gaze based on gazing data collected by one or more sensors in the head-mounted display system, (3) determine that the user's eye gaze is focused on a specific virtual element, and (4) in response to determining that the user's eye gaze is focused on the specific virtual element, increase the specific virtual element's visibility to the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
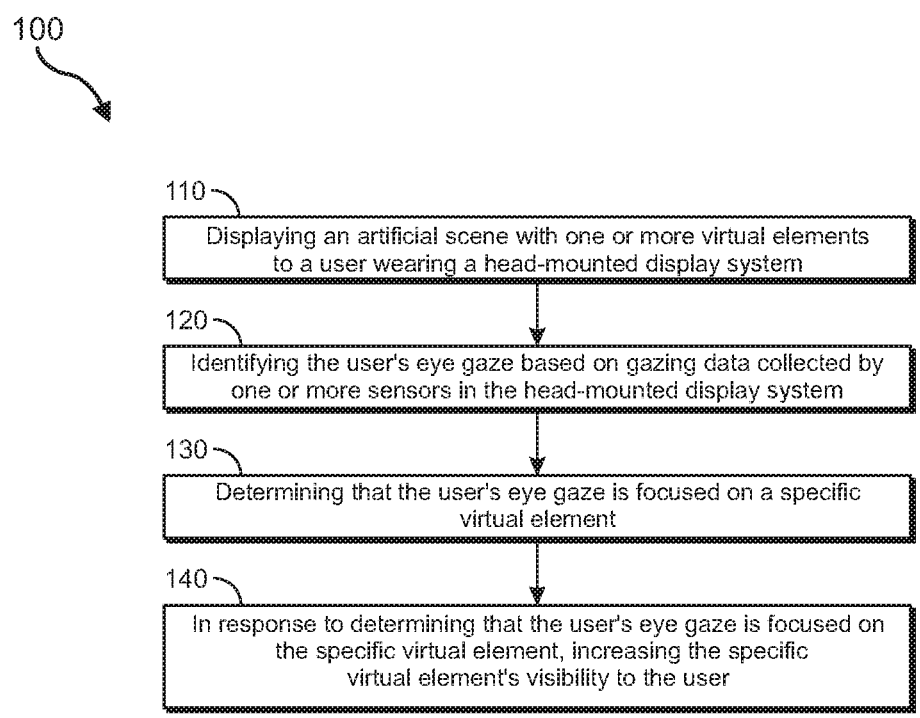
FIG. 1 is a flow diagram of an exemplary method for enabling eye-gaze based control of virtual content.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to controlling visual content displayed within an artificial reality (AR) device based on user eye gaze. A user's eye gaze may be used to control content in various ways. In one example, an object that a user's eye gaze focuses on may be brought forward in a field of view presented by the AR device. The object may be brought forward by becoming larger within the field of view. Additionally or alternatively, an object that is hidden or partially hidden may be brought more fully into view in response to being focused on by the user's eye gaze.

To provide a specific example, which will be described in greater detail below, a user wearing an AR device may be virtually presented with a group of overlapping monitors that are displayed a predetermined distance away from the user. In this example, the user's eye gaze may focus on a particular monitor that is at least partially covered by one or more of the other monitors. In response to determining that the user's eye gaze is focused on the particular monitor, the AR device may (1) virtually change the particular monitor's position to be positioned in front of the other monitors and/or (2) bring the particular monitor virtually nearer to the user (i.e., to a distance that is closer to the user than the predetermined distance).

As another specific example, which will also be described in greater detail below, a user wearing an AR device may be virtually presented with an exterior view of a house. In this example, a depth of the user's eye gaze may shift from a gaze depth corresponding to an exterior portion of the house to a gaze depth corresponding to an interior portion of the house. In response to the shift, objects within the interior portion of the house may come into view (e.g., the exterior walls of the house may become at least partially transparent to reveal the interior portion of the house).

As will be explained in greater detail below, embodiments of the present disclosure may improve an AR device's ability to meaningfully present digital content to a user. This may improve the functioning of a computer itself (i.e., an AR device) by increasing the computer's utility.

The following will provide, with reference to FIG. 1, detailed descriptions of computer-implemented methods for eye-gaze based content control. Detailed descriptions of corresponding example systems will also be provided in connection with FIG. 2. In addition, detailed descriptions of exemplary embodiments of the disclosed systems and methods will be provided in connection with FIGS. 3-6.

FIG. 1 is a flow diagram of an exemplary computer-implemented method 100 for enabling eye-gaze based virtual content control. The steps shown in FIG. 1 may be performed by any suitable computer-executable code and/or computing system, such as the systems described herein. In one embodiment, the steps shown in FIG. 1 may be performed by modules operating within a computing device capable of reading computer-executable instructions.

Figure 2:
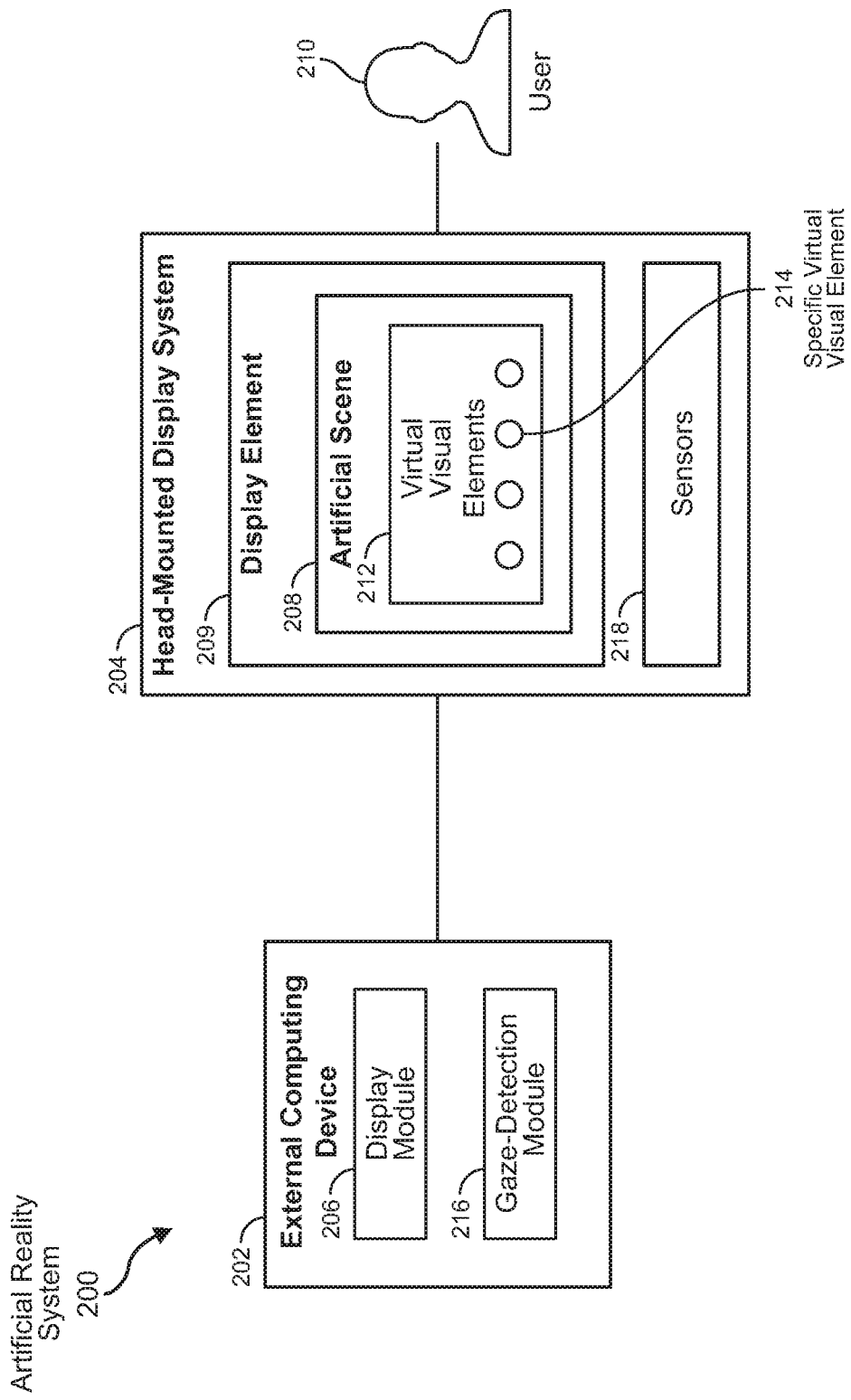
FIG. 2 is a block diagram of an exemplary system for enabling eye-gaze based control of virtual content.

In some examples, as will be described in greater detail below, this computing device may represent, or operate as part of, an artificial reality system, such as artificial reality system 200 in FIG. 2. In one example, artificial reality system 200 may include or represent a wearable device with a head-mounted display, such as head-mounted display system 204, that presents virtual stimuli (e.g., virtual visual stimuli) to a user. Exemplary embodiments of head-mounted display system 204 will be discussed in greater detail below in connection with FIGS. 3A-3B. In an additional or alternative example, artificial reality system 200 may include or represent an external computing device, such as external computing device 202, that sends visual signals to head-mounted display system 204 and/or receives data (e.g., eye-tracking data) from head-mounted display system 204. In some embodiments, each of the modules may operate within a single device (e.g., within external computing device 202 as displayed in FIG. 2 or within head-mounted display system 204). In other embodiments, the modules may be spread out across multiple devices.

As illustrated in FIG. 1, at step 110, one or more of the systems described herein may display an artificial scene (with one or more virtual elements) to a user wearing a head-mounted display system (e.g., within an artificial reality system). For example, as illustrated in FIG. 2, a display module 206 may display an artificial scene 208 (via a display element 209 of head-mounted display system 204) to a user 210 of head-mounted display system 204. Artificial scene 208 may include a variety of virtual visual elements 212, including a specific virtual visual element 214.

Figure 5A:
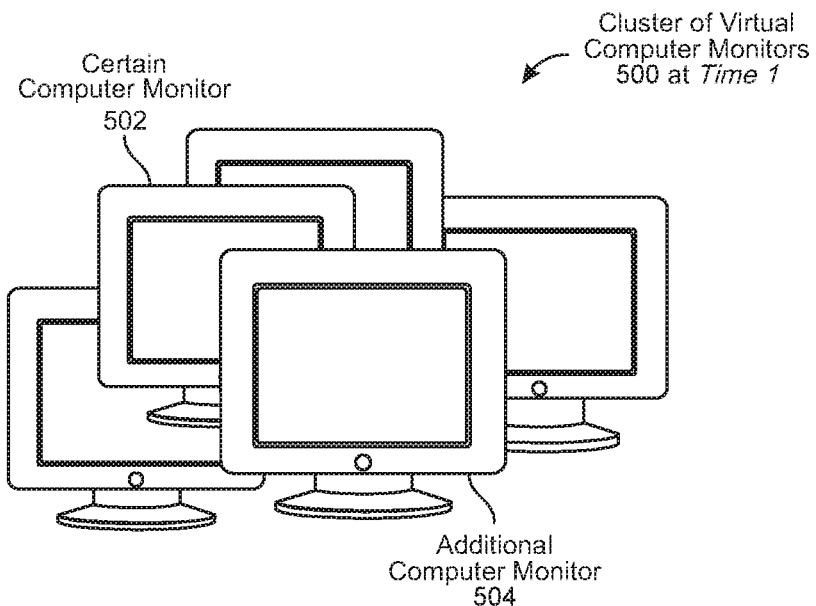
FIG. 5A is an illustration of a cluster of virtual computer monitors being displayed at a particular moment in time at which a user eye gaze is determined to be focused on a specific virtual computer monitor.
Figure 5B:
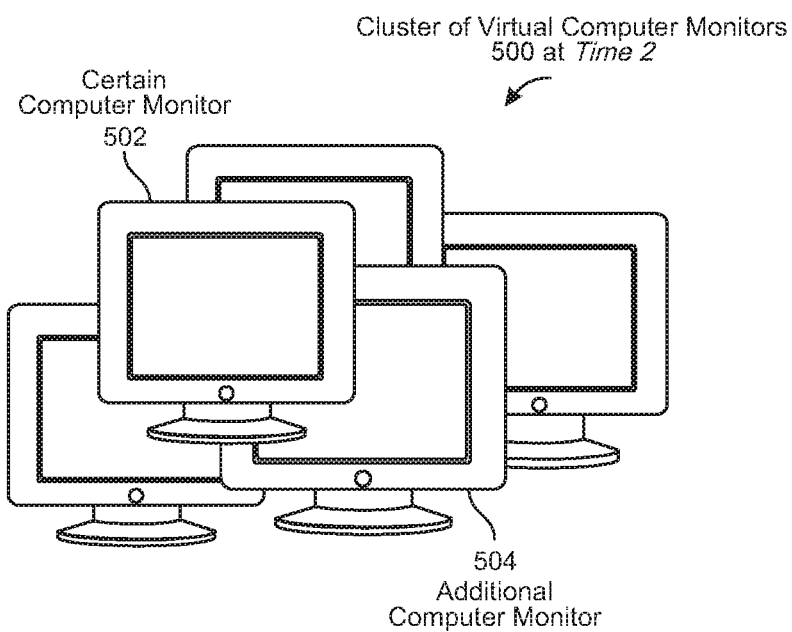
FIG. 5B is an illustration of the cluster of virtual computer monitors from FIG. 5A with a modified positioning that has been modified in response to the determination that the user eye gaze was focused on the specific virtual computer monitor at the particular moment in time.
Figure 6A:
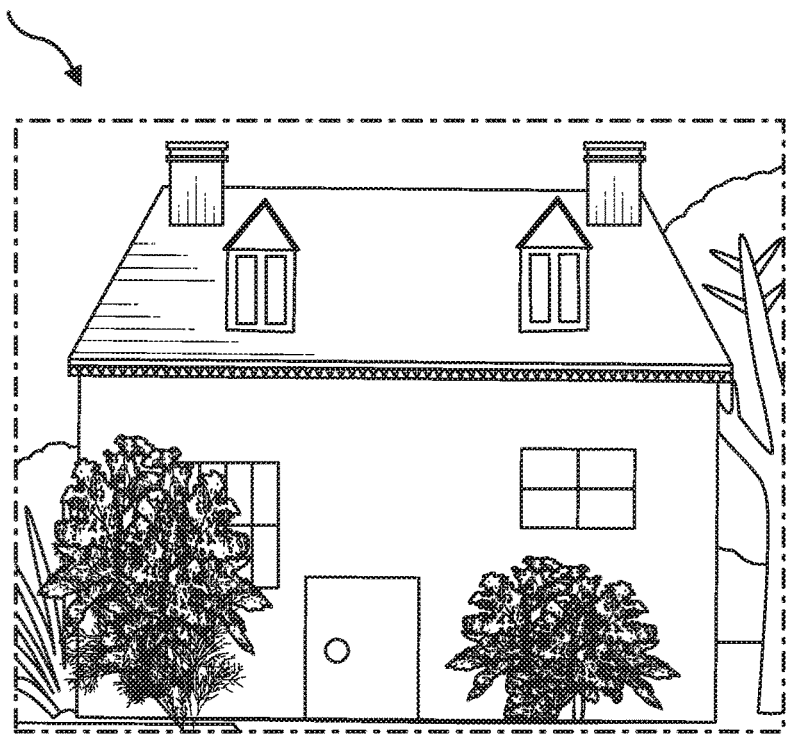
FIG. 6A is an illustration of a virtual house being displayed at a particular moment in time at which a user eye gaze is determined to be focused on a gaze depth corresponding to an interior portion of the virtual house.
Figure 6B:
FIG. 6B is an illustration of the interior portion of the virtual house depicted in FIG. 6A, which has been displayed in response to the determination that the user eye gaze was focused on the gaze depth corresponding to the interior portion of the virtual house.

Artificial scene 208 generally represents any type or form of scene that includes artificial reality content, such as virtual visual elements 212. As a specific example, artificial scene 208 may represent a virtual workspace and may include a cluster of virtual computer monitors (as illustrated in FIGS. 5A and 5B). As another specific example, artificial scene 208 may include a virtual home (as illustrated in FIGS. 6A and 6B).

In some examples, artificial scene 208 may represent a virtual scene, consisting exclusively of virtual elements. In other examples, artificial scene 208 may represent a mixed-reality scene with a combination of virtual elements and real-world elements.

Display module 206 may display artificial scene 208 in a variety of ways. For example, display module 206 may display artificial scene 208 using one or more components of artificial reality system 200 in FIG. 2, VR system 300 in FIG. 3A, and/or AR system 302 in FIG. 3B. Using FIGS. 3A and 3B as specific examples, display module 206 may display artificial scene 208 via a display element of front rigid body 310 in VR system 300 (in FIG. 3A) or via left display device 306 and/or right display device 308 of AR system 302 (in FIG. 3B).

Returning to FIG. 1, at step 120, one or more of the systems described herein may identify the user's eye gaze based on gazing data collected by one or more sensors in the head-mounted display. For example, as illustrated in FIG. 2, a gaze-detection module 216 may identify the eye gaze of user 210 based on gazing data collected by one or more sensors 218 in head-mounted display system 204.

Gaze-detection module 216 may identify the eye gaze of user 210 using any type or form of eye-tracking technology. As a specific example, gaze-detection module 216 may rely on a device embedded in and/or functioning in connection with head-mounted display system 204 to transmit light from a light source (such as infrared light from an infrared emitter) at the eyes of user 210. In this specific example, gaze-detection module 216 may rely on one or more sensors (e.g., sensors 218 embedded within head-mounted display system 204) to identify a reflection of the light source from the eyes. Then, gaze-detection module 216 may analyze the reflection to determine the direction of the user's gaze. In one example, gaze-detection module 216 may also identify changes in the user's gaze based on changes in the identified reflection.

In one example, gaze-detection module 216 may identify pixel coordinates, on display element 209, at which the user is gazing. Then, gaze-detection module 216 may identify an object or gaze depth of artificial scene 208 corresponding to the pixel coordinates and determine that user 210 is gazing at the identified object or gaze depth.

Returning to FIG. 1, as part of identifying the user's eye gaze, one or more systems described herein may determine that the user's eye gaze focuses on a specific virtual element from among the one or more virtual elements (step 130). For example, as illustrated in FIG. 2, gaze-detection module 216 may determine that the eye gaze of user 210 is focused on specific virtual visual element 214 from among virtual visual elements 212. In some examples, specific virtual visual element 214 may represent all or a portion of a discrete virtual object (such as certain computer monitor 502 in FIG. 5A). In other examples, specific virtual visual element 214 may represent a group of virtual objects positioned within a particular gaze depth (such as the interior portion of virtual house 600 depicted in FIG. 6B). Gaze-detection module 216 may determine the specific element or gaze depth being gazed at by user 210 using any type or form of gaze detection technique (e.g., as described above in connection with step 120).

In response to determining that the user's eye gaze is focused on the specific virtual element, one or more systems described herein may increase the specific virtual element's visibility to the user (step 140 in FIG. 1). For example, as illustrated in FIG. 2, display module 206 may, in response to gaze-detection module 216 determining that the eye gaze of user 210 focuses on specific virtual visual element 214, increase the visibility of specific virtual visual element 214 to user 210.

Display module 206 may increase the visibility of specific virtual visual element 214 in a variety of ways. In one example, display module 206 may bring specific virtual visual element 214 to an approached virtual distance that is virtually closer to user 210 than an initial virtual distance of specific virtual visual element 214 (i.e., that is virtually closer than the virtual distance of specific virtual visual element 214 at the time the eye gaze of user 210 is determined to be focused on specific virtual visual element 214). In one example, this may include enlarging specific virtual visual element 214 within user 210's field of view.

Figure 4A:
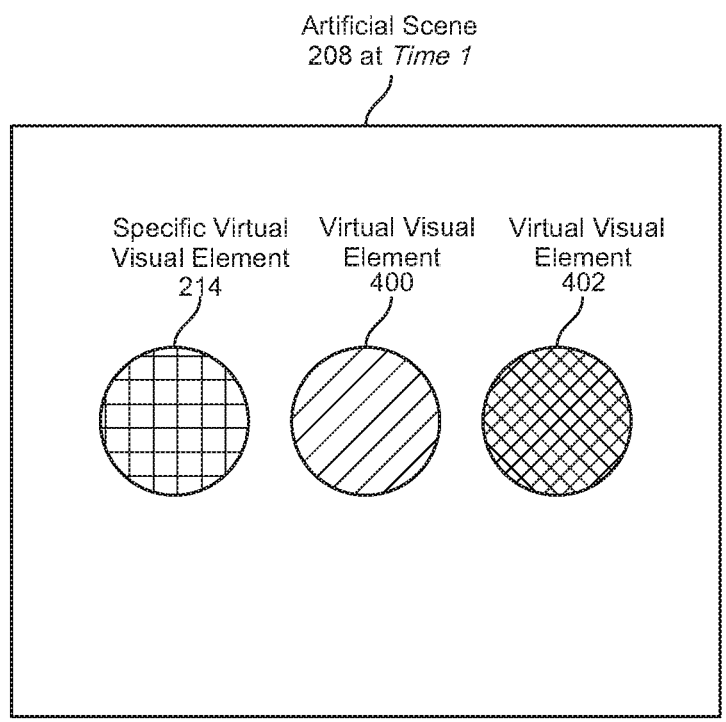
FIG. 4A is an illustration of exemplary virtual elements within an artificial scene being displayed at a particular moment in time at which a user eye gaze is determined to be focused on a specific virtual element from among the exemplary virtual elements.
Figure 4B:
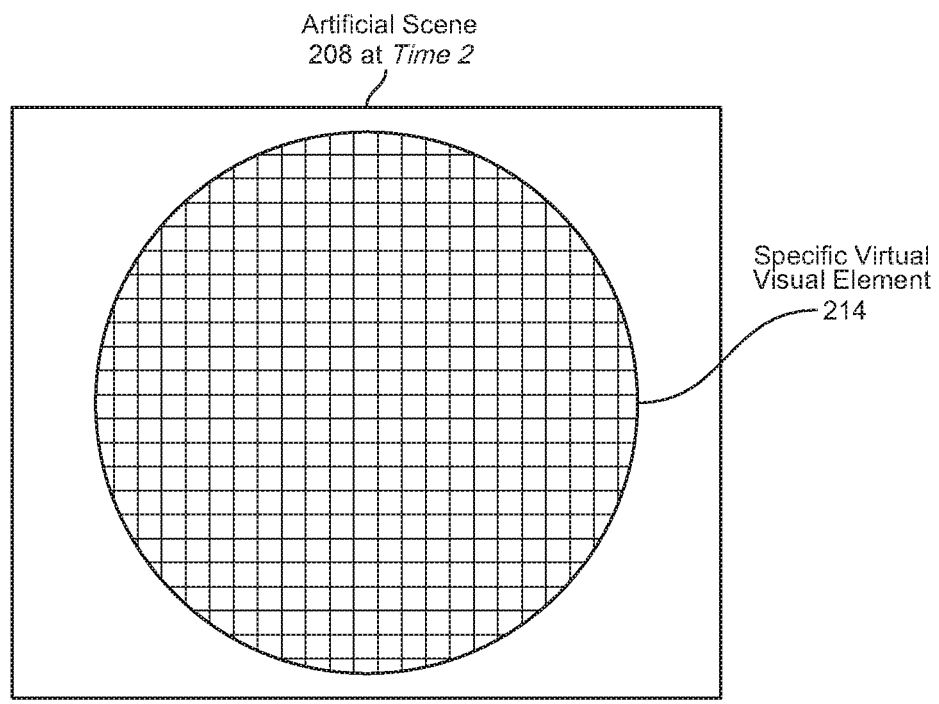
FIG. 4B is an illustration of a modified display of the exemplary virtual elements from FIG. 4A, which has been modified in response to the determination that the user gaze was focused on the specific virtual element at the particular moment in time.

FIGS. 4A and 4B provide a specific example of bringing specific virtual visual element 214 to an approached virtual distance. FIG. 4A depicts an embodiment of artificial scene 208 at a time 1 and FIG. 4B depicts the embodiment at a subsequent time 2. At time 1 (illustrated in FIG. 4A), artificial scene 208 includes three virtual elements: specific virtual visual element 214, virtual visual element 400, and virtual visual element 402, each of which is displayed at the same virtual distance from user 210 (e.g., the three virtual elements are displayed as a same size).

Then, in response to gaze-detection module 216 determining that user 210's eye gaze is focused on specific virtual visual element 214, display module 206 modifies artificial scene 208 at Time 2 (illustrated in FIG. 4B) by bringing specific virtual visual element 214 to an approached virtual distance that is virtually closer to user 210 than virtual visual elements 400 and 402 (i.e., specific virtual visual element 214 is enlarged relative to its previous size/the current size of virtual visual elements 400 and 402). In the specific example of FIGS. 4A and 4B, specific virtual visual element 214 is enlarged such that is covers (at least partially) other virtual elements within artificial scene 208.

In additional or alternative examples, specific virtual visual element 214 may be at least partially covered from user 210's field of view by one or more additional elements within artificial scene 208 at the time at which user 210's eye gaze is determined to be focused on specific virtual visual element 214. In these examples, display module 206 may increase the visibility of specific virtual visual element 214 by bringing specific virtual visual element 214 more fully into view such that specific virtual visual element 214 is less covered by the additional elements.

Display module 206 may bring specific virtual visual element 214 more fully into view in a variety of ways. In one example, display module 206 may bring specific virtual visual element 214 more fully into view by (1) moving specific virtual visual element 214 to be less covered by the additional elements and/or (2) bringing specific virtual visual element 214 to an approached virtual distance that is virtually closer to user 210 than the additional elements.

FIGS. 5A-5B may be used as a specific example of bringing a specific virtual element more fully into view by moving the specific virtual element. FIGS. 5A-5B illustrate an embodiment in which artificial scene 208 is a scene with a cluster of virtual computer monitors 500 at a time 1 (illustrated in FIG. 5A) and a time 2 (illustrated in FIG. 5B). In this embodiment, cluster of virtual computer monitors 500 may be presented to user 210 via display element 209 of head-mounted display system 204. Turning to FIG. 5A, at time 1 gaze-detection module 216 may determine that the eye gaze of user 210 is fixed on certain computer monitor 502. At time 1, certain computer monitor 502 may be partially covered from user 210's field of view by additional computer monitor 504. Then, in response to gaze-detection module 216 determining that user 210's eye gaze is fixed on certain computer monitor 502, display module 206 may, at time 2, bring certain computer monitor 502 more fully into view by moving certain computer monitor 502 such that certain computer monitor 502 is no longer covered by additional computer monitor 504 (as depicted in FIG. 5B). Additionally, though not shown in FIG. 5B, display module 206 may bring certain computer monitor 502 virtually closer to user 210 by enlarging certain computer monitor 502 relative to additional computer monitor 504.

In some embodiments, certain computer monitor 502 may be moved to cover additional computer monitor 504 (instead of being covered by additional computer monitor 504) but may stay fixed otherwise (e.g., without moving vertically or laterally). This is the embodiment depicted in FIG. 5B. Additionally or alternatively, certain computer monitor 502 may be moved vertically and/or laterally.

Returning to FIG. 2, in additional or alternative embodiments in which specific virtual visual element 214 is at least partially covered by one or more additional elements, display module 206 may bring specific virtual visual element 214 more fully into view by decreasing an opacity of the additional elements. This may enable user 210 to see specific virtual visual element 214 through the additional elements.

FIGS. 6A-6B may be used as a specific example of bringing specific virtual visual element 214 more fully into view by making additional elements covering specific virtual visual element 214 less opaque (that is, more transparent). FIGS. 6A-6B illustrate an embodiment in which artificial scene 208 is a scene with a virtual house 600 with an exterior portion (illustrated in FIG. 6A) and an interior portion (illustrated in FIG. 6B). In this embodiment, virtual house 600 may be presented to user 210 via display element 209 of head-mounted display system 204 depicted in FIG. 2.

Turning to FIG. 6A, at a time 1 display module 206 may be presenting an opaque exterior of virtual house 600. Then, gaze-detection module 216 may determine that the eye gaze of user 210 is fixed on a gaze-depth corresponding to the interior portion of virtual house 600. In response to gaze-detection module 216 determining that user 210's eye gaze is fixed on a gaze-depth corresponding to the interior portion of virtual house 600, display module 206 may, at time 2, decrease the opacity of the exterior portion of virtual house 600, revealing the interior portion of virtual house 600 (as illustrated in FIG. 6B).

As described throughout the present disclosure, the disclosed systems and methods may provide systems and methods for increasing the visibility of virtual visual content in response to determining that the virtual visual content is the focus point of a user's eye gaze. The virtual visual content may be enlarged and/or moved. Additionally or alternatively, additional virtual visual content, which is covering the virtual visual content being focused on, may be rendered more transparent to reveal (or more fully reveal) the virtual visual content being focused on.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may visually immerse a user in an artificial reality (e.g., VR system 300 in FIG. 3A). Other artificial reality systems may provide visibility into the real world (e.g., AR system 302 in FIG. 3B). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system (such as external computing device 202 in FIG. 2).

Figure 3A:
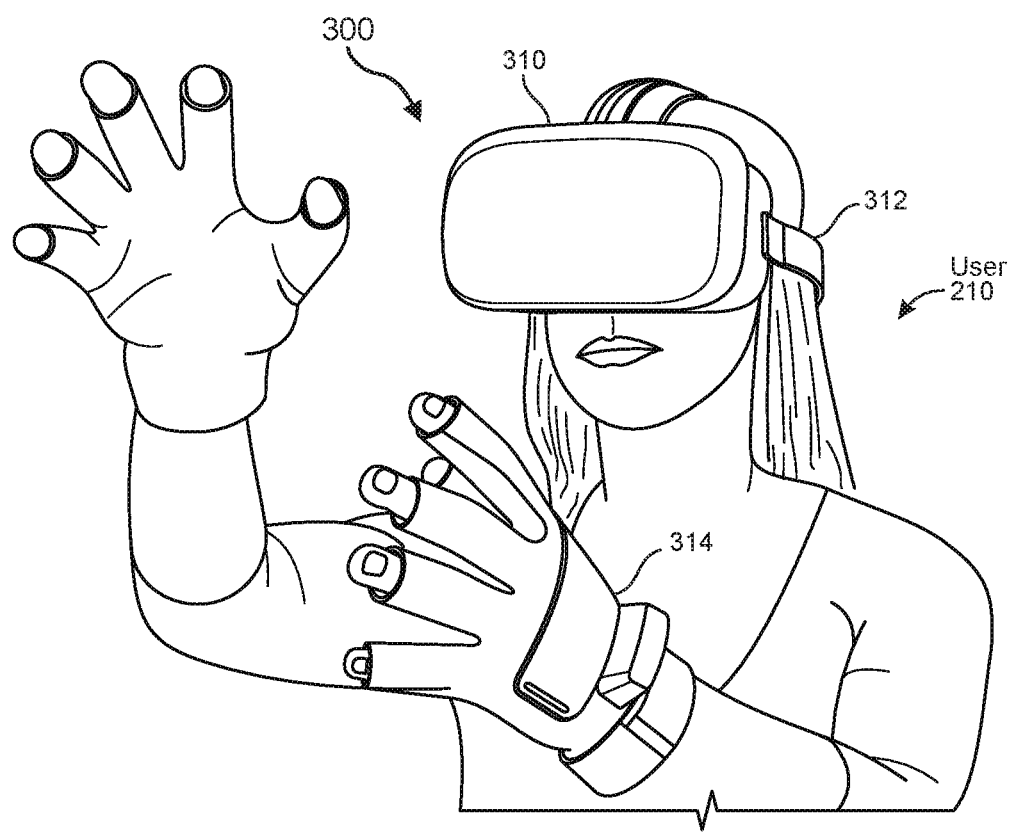
FIG. 3A is an illustration of an exemplary virtual reality system.
Figure 3B:
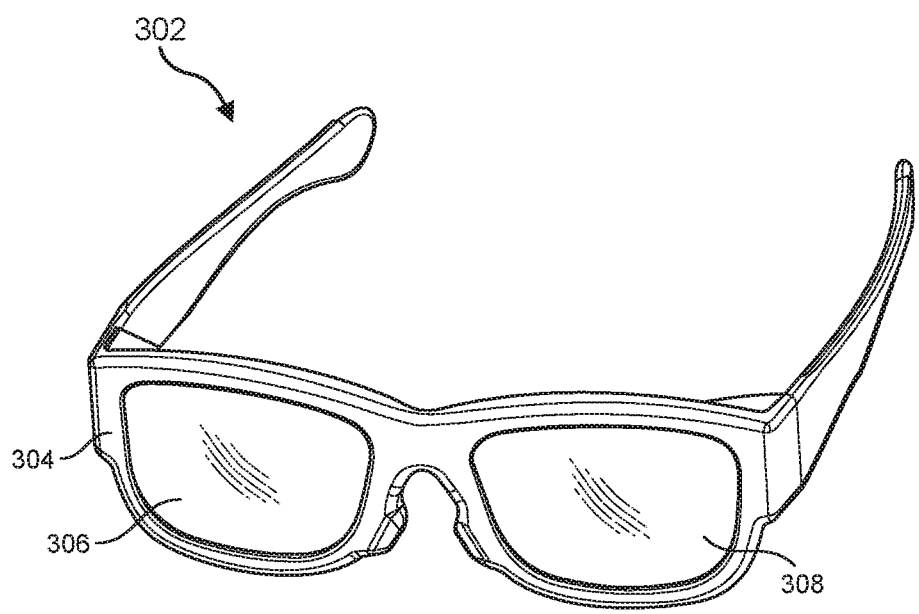
FIG. 3B is an illustration of an exemplary artificial reality system.

In one example, as shown in FIG. 3B, AR system 302 may include an eyewear device with a frame 304 configured to hold a left display device 306 and a right display device 308 in front of a user's eyes. Display devices 306 and 308 may act together or independently to present an image or series of images to a user. While AR system 302 includes two displays, embodiments of this disclosure may be implemented in AR systems with a single near-eye display or more than two near-eye displays.

As noted, some artificial reality systems may, instead of blending an artificial reality with actual reality, substantially replace one or more of a user's sensory perceptions of the real world with a virtual experience. One example of this type of system is a head-worn display system, such as VR system 300 in FIG. 3A, that mostly or completely covers a user's field of view. VR system 300 may include a front rigid body 310 and a band 312 shaped to fit around a user's head. Furthermore, while not shown in FIG. 3, front rigid body 310 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 302 and/or VR system 300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 302 and/or VR system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 302, and/or VR system 300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may include tactile (i.e., haptic) feedback systems, such as haptic feedback system 314 in FIG. 3A, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" may refer to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" may, in some examples, refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may, in some examples, refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   displaying, to a user wearing a head-mounted display system, an artificial scene comprising an opaque exterior of a virtual house;
   identifying the user's eye gaze based on eye gazing data collected by one or more sensors in the head-mounted display system;
   determining that the user's eye gaze is focused at a gaze depth corresponding to an interior portion of the virtual house, which is at least partially covered from the user's field of view by the opaque exterior; and
   in response to determining that the user's eye gaze is focused at the gaze depth corresponding to the interior portion of the virtual house increasing the interior portion's visibility to the user.

2. The computer-implement method of claim 1, wherein the artificial scene comprises at least one of:
   a virtual scene consisting exclusively of virtual elements; or
   a mixed-reality scene comprising a combination of virtual elements and real-world elements.

3. The computer-implement method of claim 1, wherein:
   at the time the user's eye gaze is determined to be focused at the gaze depth corresponding to the interior portion of the virtual house, one or more virtual elements within the interior portion are an initial virtual distance from the user; and
   bringing the interior portion of the virtual house more fully into view comprises bringing the one or more virtual elements to an approached virtual distance that is virtually closer to the user than the initial virtual distance.

4. The computer-implement method of claim 3, wherein bringing the one or more virtual elements to the approached virtual distance comprises enlarging the one or more virtual elements within the user's field of view.

5. The computer-implement method of claim 1, wherein the interior portion of the virtual house comprises a plurality of virtual elements.

6. The computer-implement method of claim 1, wherein bringing the interior portion of the virtual house more fully into view comprises decreasing an opacity of the opaque exterior of the virtual house such that the user may see the interior portion of the virtual house through the opaque exterior.

7. The computer-implement method of claim 6, wherein decreasing the opacity comprises transforming the opaque exterior to be at least partially transparent.

8. A system comprising:
   a display module, to a user wearing a head-mounted display system, an artificial scene
   comprising an opaque exterior of a virtual house; and
   a gaze-detection module, stored in memory, that:
      identifies the user's eye gaze based on eye gazing data collected by one or more sensors in the head-mounted display system; and
      determines that the user's eye gaze is focused at a gaze depth corresponding to an interior portion of the virtual house, which is at least partially covered from the user's field of view by the opaque exterior, wherein the display module, in response to the gaze-detection module determining that the user's eye gaze is focused at the gaze depth corresponding to the interior portion of the virtual house, increases the interior portion's visibility to the user; and
   at least one physical processor configured to execute the display module and the gaze-detection module.

9. The system of claim 8, wherein the artificial scene comprises at least one of:
   a virtual scene consisting exclusively of virtual elements; or
   a mixed-reality scene comprising a combination of virtual elements and real-world elements.

10. The system of claim 8, wherein:
    at the time the user's eye gaze is determined to be focused at the gaze depth corresponding to the interior portion of the virtual house, one or more virtual elements within the interior portion are an initial virtual distance from the user; and
    the display module brings the interior portion of the virtual house more fully into view by bringing the one or more virtual elements within the interior portion to an approached virtual distance that is virtually closer to the user than the initial virtual distance.

11. The system of claim 10, wherein the display module brings the one or more virtual elements to the approached virtual distance by enlarging the one or more virtual elements within the user's field of view.

12. The system of claim 8, wherein the interior portion of the virtual house comprises a plurality of virtual elements.

13. The system of claim 8, wherein the display module brings the interior portion of the virtual house more fully into view by decreasing an opacity of the opaque exterior of the virtual house such that the user may see the interior portion of the virtual house through the opaque exterior.

14. The system of claim 13, wherein decreasing the opacity comprises transforming the opaque exterior to be at least partially transparent.

15. A non-transitory computer-readable medium comprising one or more computer-readable instructions that, when executed by at least one processor of a computing device, cause the computing device to:
    display, to a user wearing a head-mounted display system, an artificial scene; comprising an opaque exterior of a virtual house;
    identify the user's eye gaze based on eye gazing data collected by one or more sensors in the head-mounted display system;
    determine that the user's eye gaze is focused at a gaze depth corresponding to an interior portion of the virtual house, which is at least partially covered from the user's field of view by the opaque exterior; and
    in response to determining that the user's eye gaze is focused at the gaze depth corresponding to the interior portion of the virtual house, increase the interior portion's visibility to the user.

16. The non-transitory computer-readable medium of claim 15, wherein the artificial scene comprises at least one of:
    a virtual scene consisting exclusively of virtual elements; or
    a mixed-reality scene comprising a combination of virtual elements and real-world elements.

17. The non-transitory computer-readable medium of claim 15, wherein bringing the interior portion of the virtual house more fully into view comprises decreasing an opacity of the opaque exterior of the virtual house such that the user may see the interior portion of the virtual house through the opaque exterior.

18. The non-transitory computer-readable medium of claim 17, wherein decreasing the opacity comprises transforming the opaque exterior to be at least partially transparent.

19. The non-transitory computer-readable medium of claim 15, wherein:
- at the time the user's eye gaze is determined to be focused at the gaze depth corresponding to the interior portion of the virtual house, one or more virtual elements within the interior portion are an initial virtual distance from the user; and
- bringing the interior portion of the virtual house more fully into view comprises bringing the one or more virtual elements to an approached virtual distance that is virtually closer to the user than the initial virtual distance.

20. The non-transitory computer-readable medium of claim 19, wherein bringing the one or more virtual elements to the approached virtual distance comprises enlarging the one or more virtual elements within the user's field of view.

\* \* \* \* \*